United States Patent [19]

Ackeret

[11] Patent Number: 4,772,168
[45] Date of Patent: Sep. 20, 1988

[54] DEVICE FOR REARRANGING A PILE OF SHEETS

[75] Inventor: Perer Ackeret, Kusnacht, Switzerland

[73] Assignee: Licinvest AG, Chur, Switzerland

[21] Appl. No.: 888,324

[22] PCT Filed: Nov. 12, 1985

[86] PCT No.: PCT/EP85/00606

§ 371 Date: Jul. 11, 1986

§ 102(e) Date: Jul. 11, 1986

[87] PCT Pub. No.: WO86/03020

PCT Pub. Date: May 22, 1986

[30] Foreign Application Priority Data

Nov. 13, 1984 [DE] Fed. Rep. of Germany ....... 3441464

[51] Int. Cl.[4] .............................................. G09F 11/30
[52] U.S. Cl. ...................... 414/37; 40/511; 40/513; 221/151; 221/197; 221/239; 221/246; 271/3.1
[58] Field of Search .......... 40/490, 511, 513; 221/151, 152, 197, 220, 239, 245, 246, 312 C; 414/37; 271/3.1

[56] References Cited

U.S. PATENT DOCUMENTS

| | | | |
|---|---|---|---|
| 4,238,898 | 12/1980 | Ackeret | 40/513 |
| 4,241,528 | 12/1980 | Ackeret | 40/490 X |
| 4,241,529 | 12/1980 | Baur | 40/513 |
| 4,259,802 | 4/1981 | Ackeret | 40/513 |
| 4,376,348 | 3/1983 | Ackeret | 40/490 X |

FOREIGN PATENT DOCUMENTS 2403207 4/1979 France .

*Primary Examiner*—Robert J. Spar
*Assistant Examiner*—Janice Krizek
*Attorney, Agent, or Firm*—Robert R. Jackson

[57] ABSTRACT

The invention relates to a device for the cyclic rearrangement of a pile of rectangular or square pictures, with a first and a second frame part (12, 14) which can be moved back and forth relative to one another and parallel to the principal plane of the pile of pictures enclosed by the two of them, and with element which, on moving the frame parts (12, 14) back and forth, remove a single picture (188) from one end of the pile and reinsert on the other end of the pile and which have a separator for separating the individual picture (188) from the pile of pictures, a feeder for feeding pictures to the separator a retainer for holding the individual picture (188) in the first frame part and for holding the remainder of the pile in the second frame part (12, 14) and a guide for guiding the separated individual picture (188) for the purpose of returning it to the other end of the remainder of the pile, wherein the separator has a first and a second separating device (68, 20) on the first and on the second frame part (12, 14) respectively, which form a through-gap for the individual picture (188), and a device coupled to a control member (87) is provided which can be brought by the control member (87) into a position that blocks the through-gap.

20 Claims, 9 Drawing Sheets

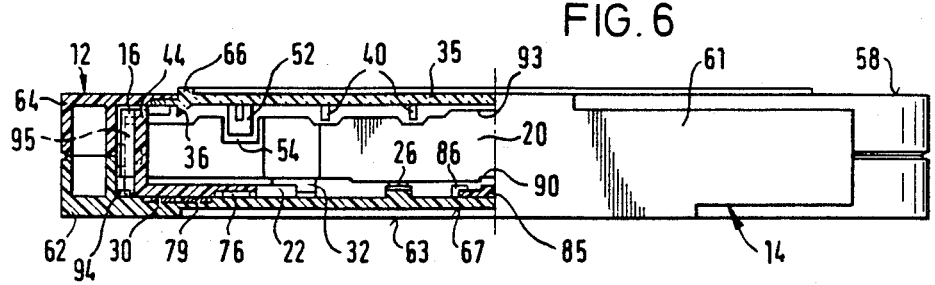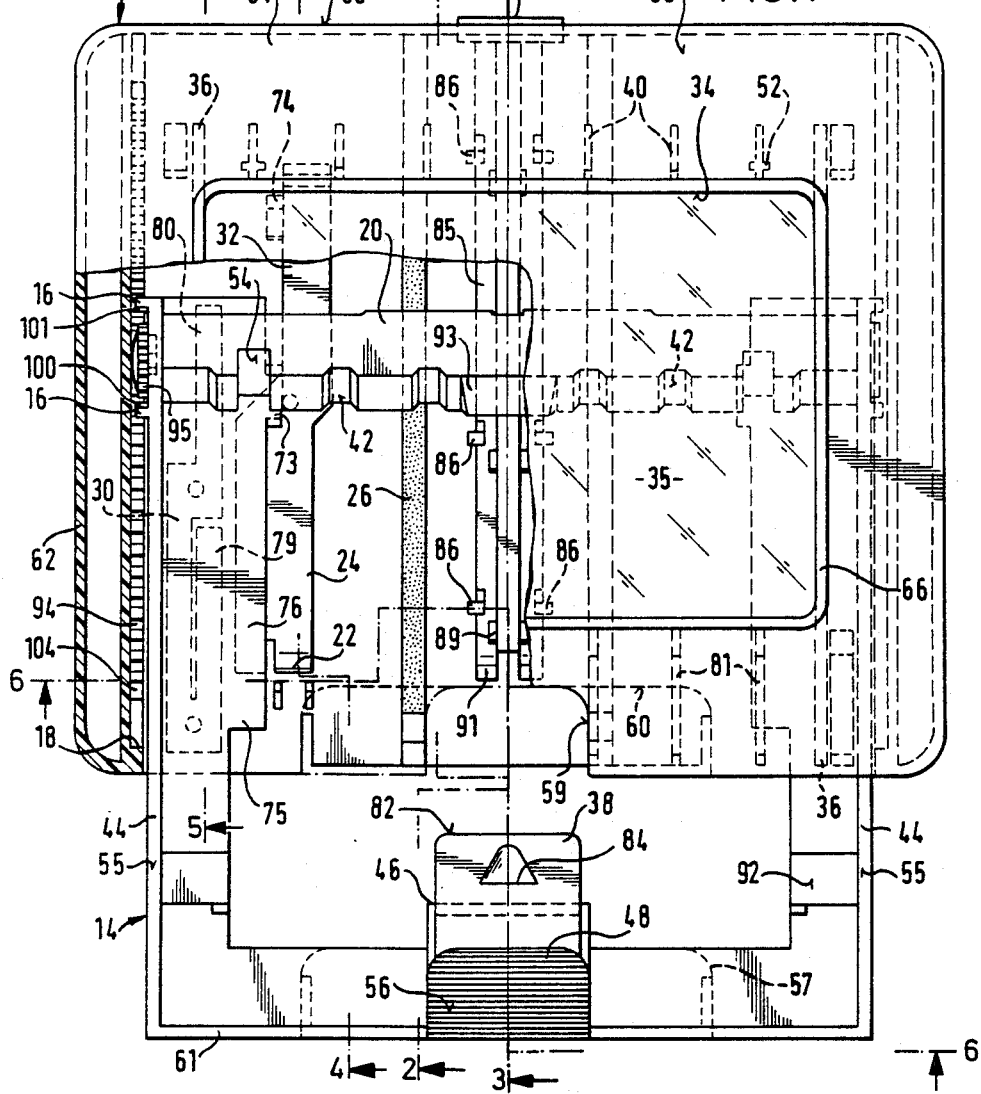

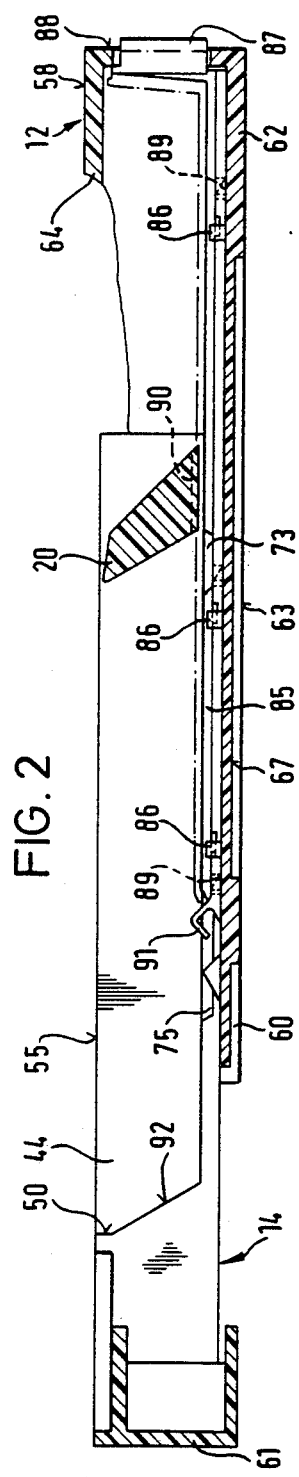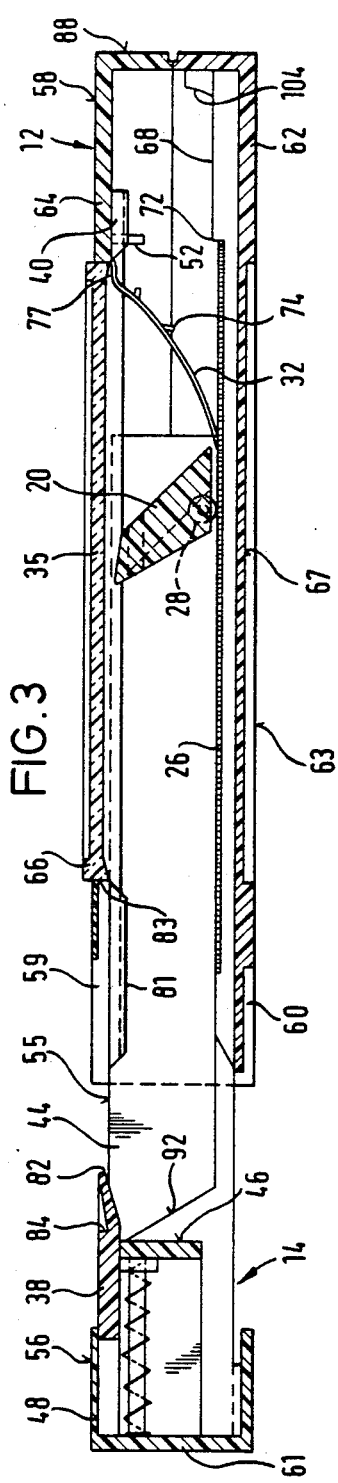

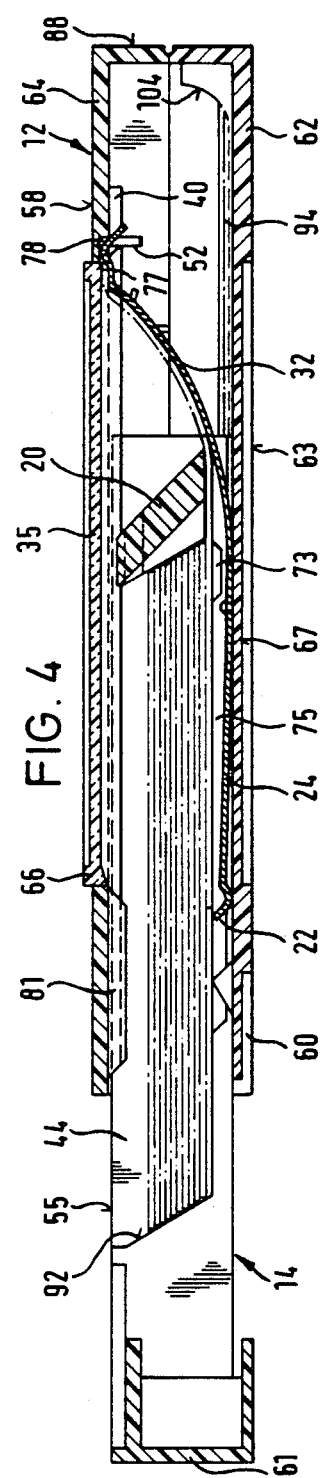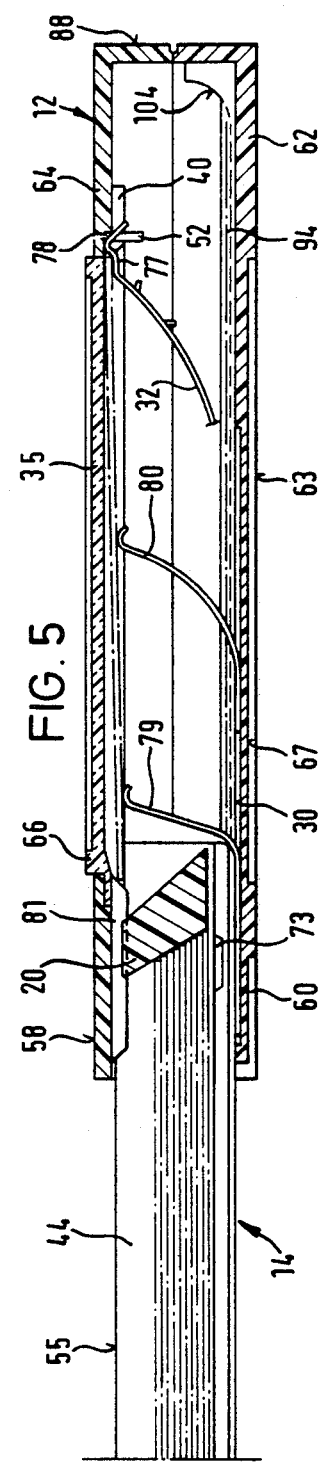

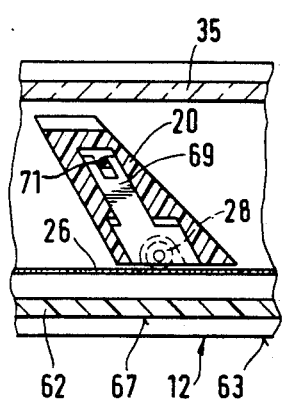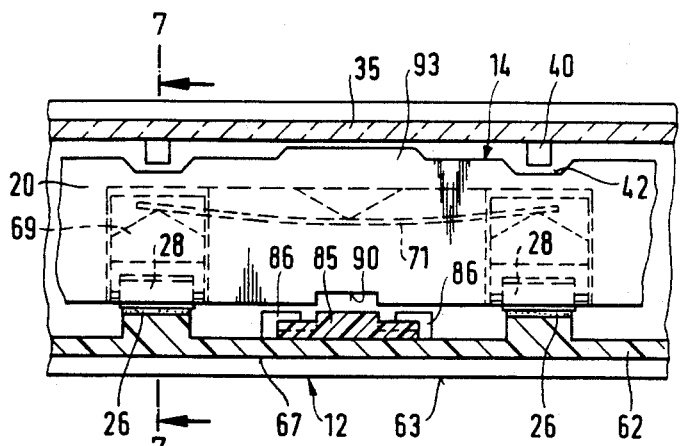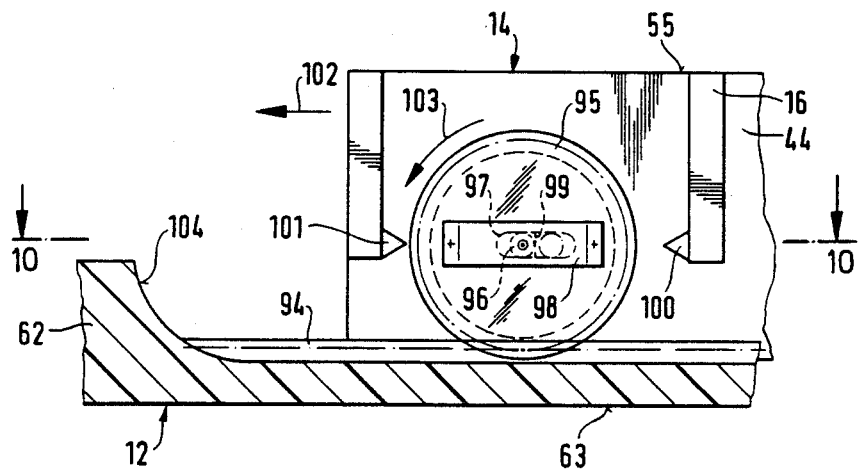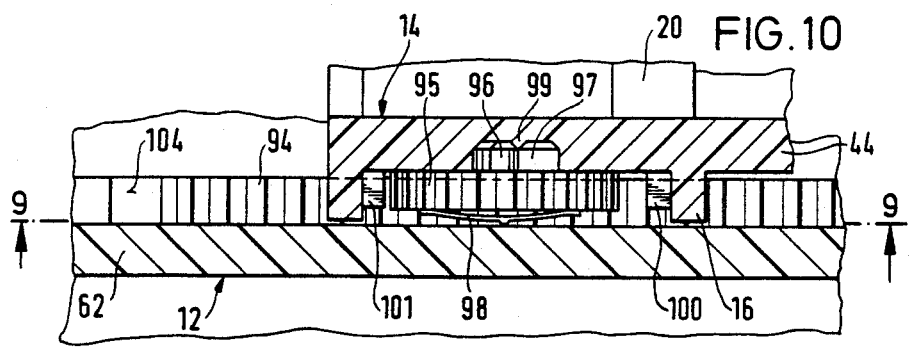

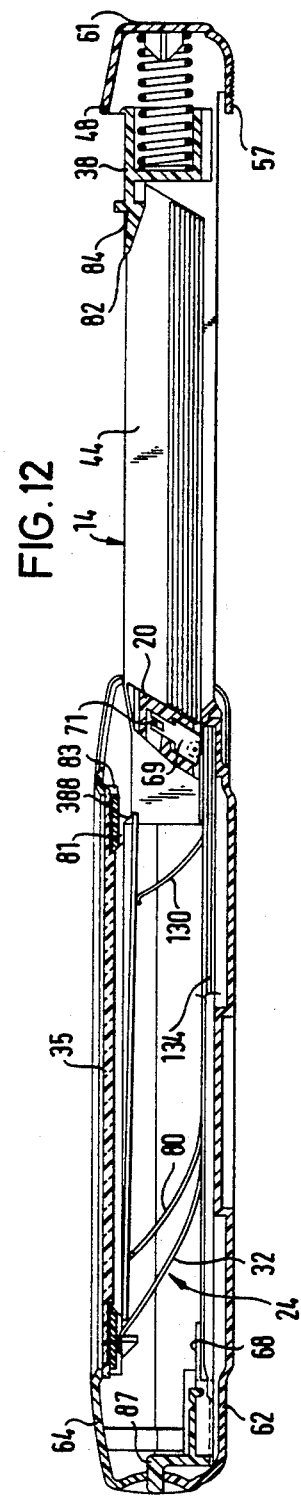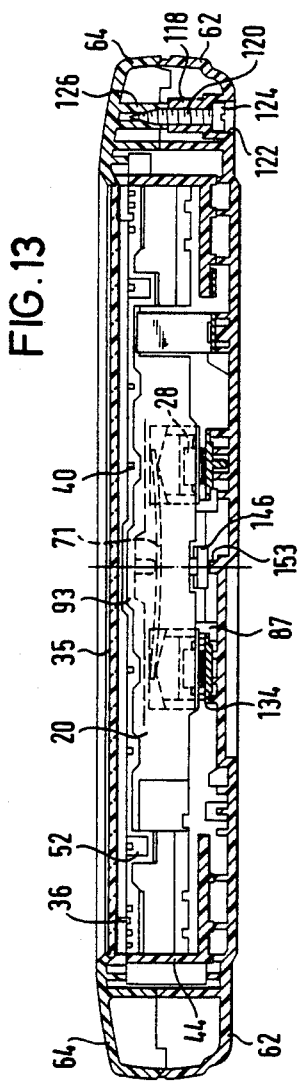

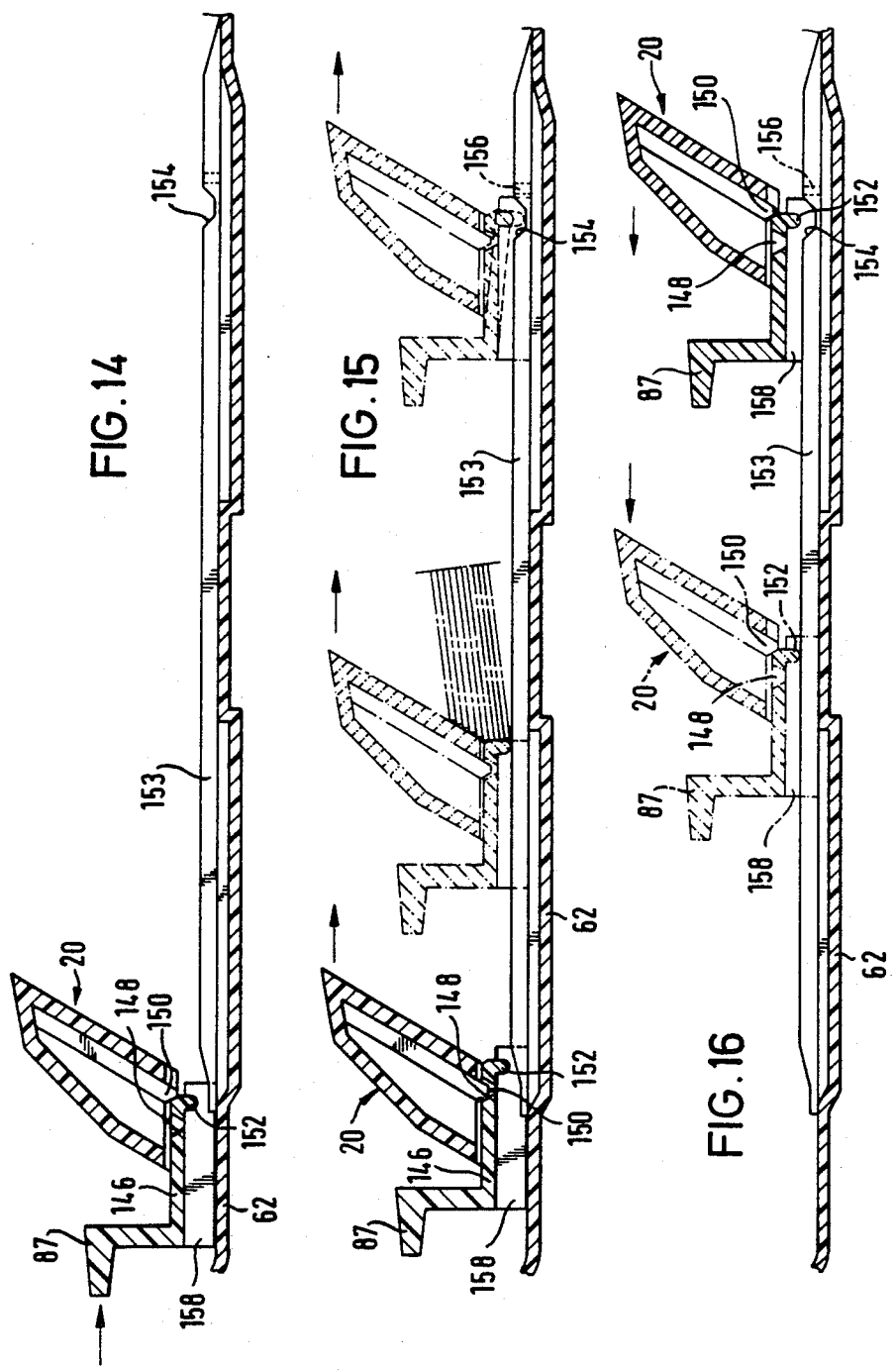

DEVICE FOR REARRANGING A PILE OF SHEETS

The invention relates to a device for the cyclic rearrangement of a pile of rectangular or square sheets, especially photographic prints (pictures), with a first frame part and a second frame part that is movable back and forth relative to the first. The frame parts in the pushed together state enclose the pile of sheets and contain means which, when the frame parts are moved away from one another, remove a sheet from one end of the pile and, when the frame parts are moved back together again, put the sheet back on the other end of the pile. Here, and in the following, the words "sheet" and "picture" are used synonymously.

Such devices, occasionally called "picture changers", are known from U.S. Pat. Nos. 4,238,898, 4,238,899, 4,241,528, 4,241,529, 4,245,417, 4,259,802 and 4,376,348. There is also provided in the known picture changers a means for de-activating the changeover function by making one of the means provided for the changeover function inoperative, for example a retentive coating drive acting on the exposed area of the sheet to be separated, which drive can be removed from engagement with the pile manually.

To do this, space must be created in the frame parts in the direction of the thickness of the pile, which is undesirable for aesthetic reasons.

Basically, the elements participating in the changeover function comprise a separating means, which defines a through-gap for the sheet to be separated, a feeding means, which feeds sheets to the separating means, a retaining means for holding the separated sheet in the relevant frame part, and a guide means which presents the separated sheet for reintroduction onto the top of the pile or the bottom of the pile.

According to the above arrangements, therefore, the feeding means and, depending on the design, also the retaining means, are de-activated, so that the entire pile can be removed from the device, preferably by means of the frame part accessible after the frame parts have been moved away from one another.

In the course of this, relatively large forces are transmitted by a control mechanism, which is accessible from the outside, since the bias of a powerful spring bias system must be overcome. The components are given appropriate dimensions for this task. The problem of the invention is to render inoperative the changeover function by means of relatively small components, which can be manufactured at a correspondingly favourable price and which it is easier to find room for in the device. Claim 1 defines the solution according to the invention which comprises blocking the through-gap in order to render inoperative the changeover function. When feeding the sheets to the separating means care is taken that, when the separating means is blocked, the sheets can be released as soon as an adequately large force is exerted against the direction of action of the feeding means and removed as a complete pile from the exposed frame part. The feeding means may in this case be designed, for example, as a contact face acting on the sheet edge which, when appropriate force is exerted on the sheet, slides off the sheet edge.

Further advantages and developments of the invention are disclosed in the following description and in the claims.

The invention is described in detail hereinafter by way of examples of execution illustrated in the accompanying drawings.

FIG. 1 shown in plan view and partially cut-away a picture changer with the slider member partially withdrawn.

FIGS. 2 to 10 shows sections and details of the picture changer of FIG. 1.

FIGS. 11 to 16 show an additional embodiment of a picture changer.

Figure 11:
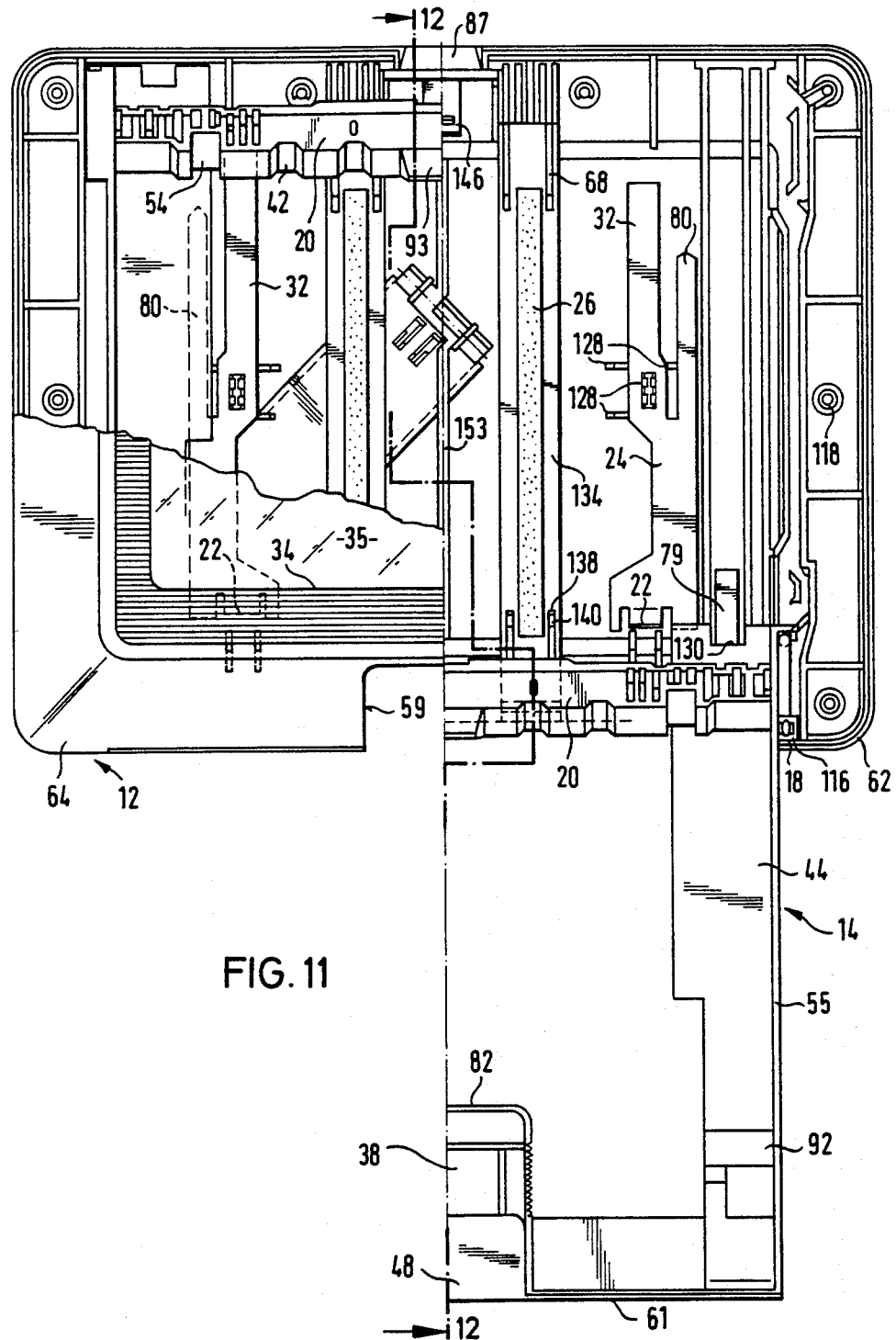

The picture changer shown in FIGS. 1 to 10 comprises as first frame member a housing 12 and as second frame member a slider member 14 for accommodating a pile of pictures, wherein the slider member 14 can be pulled out of the housing 12 for a distance limited by stop members 16 on the slider member and complementary stop members 18 on the housing and pushed back in again. The separating means is formed by a separator bar 20. The feeding means is embodied by hook-like members 22 which are located on leaf-spring type spring arms 24. The retaining means for holding the remainder of the pile in the slider member is likewise formed by the separator bar, whilst the separated individual picture is held in the housing by the co-operation of rails, arranged fixedly in the housing and provided with a retentive coating 26, with rollers 28 that hold the individual picture firmly against the rails and are caused to rotate as a result of contact with the rails. Finally, the guide means is embodied by pairs of leaf springs 30 and spring arms 32, the spring arms 32 being formed integrally with the spring arms 24.

In the inserted state of the slider member 14, the spring arms 24 and 32 press the pile of pictures (not shown in FIG. 1) against a viewing window, the inner border of which is denoted by 34. The picture which is then uppermost in the pile, a photographic print, is intended to lie as flat as possible; to that end, at its periphery it is supported in a plane that is defined by lateral ribs 36, by the underside of a slidable catch 38 and, at the opposite end, by ribs 40 moulded on the housing.

FIG. 1 shows the partially withdrawn position of the slider member 14. In the inserted state, the separator bar lies on the other side of these ribs 40; however, because it projects further towards the window 35 which corresponds to the height of these ribs, it has recesses 42 so that the ribs are able to pass through.

The edges of the pile are supported laterally, (that is, parallel to the withdrawal direction) by side pieces 44 of the slider member. At the front, that is, on the side of the slider member that is furthest away from the housing when the slider member is withdrawn, the edges are supported by the stop face 46 of a centrally arranged grip part 48 that the user may grip and by lateral stop faces 50 on the slider member. At the opposite end, the edges of the photographs are supported against stop members 52 moulded on the housing, for the passage of which the separator bar likewise has recesses 54 that are substantially deeper than those for the ribs 40.

The rib 36 extends further into the interior of the slider member than the height that is defined by the top edge 55 of the side pieces of the slider member so that the photographs are unable to slide out laterally over the side pieces of the slider member. An analogous action occurs between the separator bar on the one hand and the ribs 40 on the other.

The grip part 48 has a top part 56 arranged on the window side of the housing and a bottom part 57 which is wider than the top part; the top wall 58 of the housing, surrounding the window in the manner of a frame, has a cut-out 59 in the region of the top part whilst the opposing housing wall is recessed at 60 in a complementary manner for the bottom part 57. Accordingly, in its closed state the device has a closed, substantially rectangular outline without any protruding parts.

The housing and the slider member are injection-moulded plastics parts. The slider member is a one-piece element, comprising side-pieces, separator bar, grip part and a front wall 61 joining the grip part to the side pieces, which are of L-shaped cross-section.

The housing is composed of three parts: the bottom shell 62 providing the base 63, the frame-like upper shell 64 with the window aperture, and the window 35 set into this. The housing is reinforced in the direction of the slider member movement in that the struts between the top and bottom wall are constructed as double supports, as shown in FIG. 6. The housing parts can be welded together, or a snap-fit connection may be provided.

Around its main surface the window has a narrow border 66 that protrudes slightly outwards, so that it is somewhat proud in respect of the frame surrounding it. A recess that is complementary with the outline of this edge on the outside of the opposite bottom wall is denoted by the numeral 67 and permits several housings to be stacked one on top of the other.

When the slider member is withdrawn from the housing, it is gripped using one hand at the top and bottom parts of the grip part, whilst the other hand holds the housing. The hook-like members 22 engage the front edges of the photographs lying on the spring arm ends, that is the edges furthest away from the separator bar, as a result of which a certain number of photographs, depending on the height of the hook-like members, is fed to the separating means. This is basically formed as a through-gap which is defined, firstly, by (in the example of execution) two lands 68 moulded on the base of the housing on the inside and, secondly, by the underside of shoes 69 that oppose the lands, the shoes being inserted into the separator bar and shown in FIG. 7 in section and in FIG. 8 in front view.

Each land 68 is associated with a respective shoe 69 and the land/shoe arrangements are located on both sides of the plane of symmetry of the device. The shoes are guided longitudinally in the separator bar, are supported on a knife-edge-like bearing and biassed by an inserted wire spring 71. Each shoe additionally accommodates a small roller that is rotatable about an axis at right angles to the withdrawal direction and the small roller 28 projects slightly from the shoe.

FIG. 3 shows the position of the lands 68 which protrude by fully the thickness of a photographic print further above the level of the base of the housing than the surface of the retentive coating 26. In the rest or closed position of the slider member, the lowermost portion of the shoes is spaced somewhat from the edge 72 of the land, and the surface of the separator bar facing towards the pile is sloped, somewhat like a wedge, such that, as the separator runs onto the edge of the pile, the photographs, on the opposite edge of which the hook-like members 22 are acting, "migrate" downwards along the oblique face towards the edge 72 of the lands facing them. There is sufficient room between the shoes 69 and the retentive coating 26 for the leading edge of a single photograph alone (the lowest in the pile) to be able to enter the gap forming between the shoes 69 and the retentive coatings 26, for as long as this gap is held open by the land 68 as will be explained. All the other photographs transported with the hook-like member 22 come up against the separator itself or against the shoes thereof with the result that the hook-like members slip off the extreme edge of the photographs.

When the rear edges (in the withdrawal direction) of the shoes 69 have passed the edge 72 of the lands 68, the shoes drop under the action of the wire spring 71, the rollers 28 positioning themselves on the individual photograph that has been separated in this manner and pressing it onto the associated retentive coatings so that it is firmly held in the housing, that is, the first frame part. The remainder of the pile is transported by the separator together with the slider member to the outside until the slider member has been fully withdrawn.

Care should be taken therein that the separator bar also runs over the spring arms 32. So that they do not stress the separated picture from below during the passage of their ends acting on the pile, during a certain phase of the withdrawal movement they are pressed mechanically towards the base of the housing. Spring-depresser members 73 moulded onto the slider member side pieces 44 are used for this purpose; these spring-depresser members pass over projections 74 extending laterally from the spring arms and hold the arms for a part of the withdrawal movement corresponding to the length of the spring-depresser members. Further spring-depresser members 75 on the slider member side pieces run onto the spring arms 24 at the enlarged portion 76 as soon as the individual photograph has been safely held between the retentive coating and the rollers, and press these arms likewise away from the viewing window so that further photographs can be introduced and others removed without hindrance.

On the side of the separator furthest from the pile the spring arms 32 are released again after travelling a short distance so that they again act from beneath the separated photograph and guide its rear edge gradually towards the window. Finally, this edge positions itself under the influence of the springs against the upper side of the housing. Because the free ends of the spring arms are rounded, but this edge shall on the other hand be firmly held at the position it has reached, a short portion of the spring arms is additionally of linear formation, denoted by 77 in FIG. 4. The rounded spring arm end finds space in a recess on the inside of the housing top wall, denoted by 78 in FIG. 5.

The two hook-like members 22, the two shoes 69, the retentive coatings 26 and the spring arms 32 are all in each case arranged symmetrically with respect to the central plane of the device as a whole, and the two hook-like members 22 lie as exactly as possible on a line that is at right angles to this plane of symmetry. This means that the photograph to be changed then goes through the changeover operation without being rotated even when it is not guided by the slider member side pieces because it has dimensions smaller than its nominal ones. The dimensional tolerances of photographs are, in fact, with the same nominal size, different in the transverse and longitudinal direction: since the processing firms work with photographic paper from rolls of very accurately defined width and then cut the photographic paper up into different lengths, it is preferable to have the closer toleranced dimension of the photograph in a direction appropriate to that in which the slider member moves.

The completely separated individual picture, which until now has been described as being held only at its one edge, is lifted towards the window. For this, the leaf springs 30 already mentioned having forwardly-positioned arms 79 and rearwardly-positioned arms 80 are used, these arms holding and supporting the individual photograph, as seen clearly from FIG. 5, in such a manner that it is able to return to the pile again as the slider member is pushed back in. In the closed state of the device and during the withdrawal movement of the slider member, at least during the initial part thereof, the spring arms 79, 80 are pressed by the side pieces of the slider member into complementary grooves in the base of the housing, which may be seen in FIG. 6.

At the start of the return movement of the slider member, the individual photograph is held by the spring arms 32 in front of the stop members 52 moulded on the housing and is supported in the direction of the separator bar at four points by the spring arms 79, 80. The other transverse edge of the photograph facing towards the separator bar may hang down; the side of the separator facing it is, however, sloped, somewhat like a wedge, so that the edge is raised gradually as the separator bar runs onto it. Between the top edge of the separator bar and the top wall of the housing there is a gap which is generously dimensioned for the passage of the photograph. The risk of the photograph striking against the edges facing it of the remainder of the pile transported by the slider member is countered by the top wall of the housing having holding-down lugs 81 on its inside which hold the pile below the level of the top side of the separator. These holding-down lugs are aligned with the ribs 40 so that they pass through the complementary recesses 42, 54 of the separator bar.

The slidable catch 38 is mounted so as to slide in the grip part and is biassed by a spring towards the housing, as readily recognisable from FIG. 3. As the slider member is inserted, the free edge 82 of the slidable catch strikes against a stop member 83 provided in the housing, as a result of which the slidable catch is pushed back into the grip part and does not project into the space visible through the housing window. Once the slider member has been pulled out, however, the slidable catch prevents the photographs lying in the slider member from falling out. To change the photographs, the slidable catch can be pushed back manually, which is facilitated by the finger-engageable edge 84. The photographs may be pushed out from the underside of the slider member by getting hold of them between the side pieces, or they may be grasped from above next to the grip part.

In the case of the procedure described so far, the separated photograph always remains behind in the housing. It is not possible, or only possible with difficulty, to remove this from the device. In order to be able to remove the pile even when this consists of one picture only, a special arrangement is therefore provided.

A control bar 85 is slidably mounted in the housing, held by retainers 86 moulded onto the housing. The bar carries an actuating or control key 87 which passes through the rear wall 88 of the housing and projects slightly beyond the outline of the changeover device. By applying pressure with the fingers to the key, the bar runs on wedge-like guide members 89 on the base of the housing and is thereby lifted towards the window. The width of the bar fits exactly into a complementary recess 90 in the separator and blocks, for the entire withdrawal movement of the slider member, the through-gap of the separating means, so that every picture located in the device has to be transported out with the slider member. Close to the outer end position of the slider member, its separator bar runs over an upwardly-projecting part 91 of the bar which yields resiliently downwards; if the slider member is now pushed back in, the separator bar first pushes the bar back into its initial position, before it can be freely guided back with the upwardly-projecting part 91 being deflected again.

As mentioned above, the photographs are intended to be held by the means described at a distance from the window pane so that during the changeover operations it does not come into contact with the surface of the picture, causing scratch damage to occur. There is still this danger, however, because the photographs are not always flat, but generally speaking are bowed either in the longitudinal or in the transverse direction. In the case of curvature in the longitudinal direction, the ribs 36 effective for the entire withdrawal movement are sufficient. In the other case, however, the slidable catch is effective but the opposite portion of the separator bar would hardly be able to absorb the considerable stresses which occur in a relatively thick pile of similarly bowed photographs Beneath the stop faces 50 the front wall of the slider member therefore has, near the side pieces 44, inclined faces 92 which are substantially parallel to the separator slope lying opposite. The photographs thus lie so that they are staggered obliquely between separator and inclined faces, so that most of the stresses in the pile are distributed over the entire surface of the separator. In addition, in the centre of the separator bar a projection 93 is provided which takes up the residual stress of those photographs which are supported against the stop faces 50 perpendicular to its edge.

Once the user has begun to carry out the changeover movement, this must be completed in order to bring the device back into the initial position. The slider member cannot therefore be pulled out halfway and then pushed in again.

This is effected by means of a mechanism which is shown in detail in FIGS. 9 and 10. Moulded onto the housing there is a toothed rack 94 with which a pinion 95 meshes, the pinion being integrally-formed with its shaft 96. The shaft fits in a slot 97 running parallel to the rack in the side piece 44 of the slider member, in which slot it is pressed and held by means of a small leaf spring 98, moulded onto the pinion, and resting against the housing.

The slot 97 is divided by means of a rib 99 into two parts, in which the shaft 96 has only a little lateral play. Finally, moulded onto the slider member on both sides of the slot there are locking lugs 100, 101 which lie in the plane of the toothed circumference of the pinion and the points of the lugs are engageable with the latter.

Let it be assumed that the pinion is in the position shown in FIG. 9 and that when the slider member moves in the direction of the arrow 102 the pinion rotates in the direction of the arrow 103. Owing to the friction of the small spring 98 on the housing wall the pinion is thereby held near the centre of the slot with its shaft resting against the rib 99. The result is a spacing, although this is small, between the circle defined by the tips of the teeth of the pinion and the point of the lug 101. If an attempt is now made to move the slider member in the opposite direction, the pinion is displaced to the outer end of the slot and its further movement immediately blocked by the point of the lug 101. At the end of the travel of the slider member, however, the toothed circumference of the pinion meets a stop sector 104 and, with the small spring 98 being deformed, is lifted over the rib 99, so that now rotation only in the opposite direction is enabled.

It is important to note that over the greater part of the withdrawal travel of the slider member the retaining means is indeed embodied by the rollers 28 in conjunction with the retentive coatings 26, but over the last part of the travel, shortly before the end position is reached, the spring arms 32, by firmly holding the individual photograph, also act as an "extension" of the retaining means.

As is apparent from the preceding explanation, each rearranged sheet is never released during the whole changeover cycle, but is held at at least two points and thus secured against rotation. It is thus constantly under control, in this case with means symmetrical to the axis.

The limbs of the slider member side pieces which are parallel to the pile and on which the separated sheet supports itself during rearrangement, should be at the most at such a distance from each other that a short photograph, which rests with one edge just against a limb of a side piece perpendicular thereto, is still held by the opposite side piece on the other edge.

As mentioned above, the device has the viewing window in the upper shell of the housing. The dimension of the window is then at the most so great in the direction transverse to the direction of movement that the shortest possible photograph, even if it is lying off-centre, does not present itself with its edge in the field of view. The same applies to the ribs 36, and just the same considerations apply to the spring arms 79 and 80 and especially to all components engaging with the sheet faces.

The construction of the spring system which is described above and illustrated, formed by the springs, cut in one piece and arranged symmetrically in pairs, with the spring arms 24 and 32, fulfils a total of five functions. Firstly, the hook-like members 22 moulded on them form the feeding means, the hook-like members finally taking along only one sheet into the separating means. Secondly, both arms together—or, more accurately, the four arms of the two springs—form a bias system with which the pile is neatly pressed against the window when the device is at rest. Thirdly, the arm 32, after it has been passed over by the separator, serves to convey the individual sheet to the housing top wall and there, fourthly, to hold it firmly. Fifthly, and finally, the arms 32 are arranged close enough to the retentive coatings 26 to be able, as a result of their bias force, to displace or peel off from the retentive coating any individual sheet which might adhere to the latter owing to a static charge. It is to be noted that the arm 32 is so shaped and arranged that it can be passed over by the separator bar without any disturbance to smooth operation.

FIGS. 11 to 16 show a further example of execution of a picture changer. The slider member 14 is housed in the housing 12 so that it can slide; the housing 12 forms the first frame part, and the slider member 14 the second. The withdrawal travel is limited by means of a bearing eye 116 which is moulded onto one of the side pieces 44 of the slider member and runs onto a stop member 18 in the housing. The housing is screwed together from an upper shell 64 and a bottom shell 62, the outer rims of which engage in an interlocking manner with each other, in the region between the side pieces 44 of the slider member and the outer edges of the housing which are parallel thereto. For this purpose, the bottom shell has in each case moulded-on guide sleeves 118 for screw shanks 120 and also recesses 122 on the outside for screw heads 124, while the upper shell carries for this purpose coaxially moulded-on bushings 126 in which the screws cut their own thread. The window 35 is clipped into the upper shell 64 and the parts of the upper shell lying beneath its outer border areas are not visible, owing to the fact that these areas of the window are frosted. In FIG. 11 the outline of the central transparent portion of the window is marked by 34.

With regard to operation, there are few differences compared with the example of execution according to FIGS. 1 to 10, so that it is sufficient to explain only the significant deviations.

In this case the spring arms 24, 32 and 80 are combined into a stamped and bent part, positioned by means of projections 128 and fixed by crimping without the application of heat. The spring arms 79, however, are separate components, which are positioned on the bottom shell by means of moulded-on projections and fixed by crimping without the application of heat. In order that this spring arm arrangement can raise up the separated picture as early as possible, the corresponding side piece 44 of the slider member has recesses 130. Secure holding of the separated picture is ensured during this phase of the changeover cycle by means of the spring arms 80, which bear the extreme edge of the picture remote from the slider member upwards like a bracket.

The two strips of retentive coating 26 are each arranged on a separately produced bar 134. On each side of the strip 26, the bar may have moulded-on resilient bridge portions which, after the separator bar 20 has passed over them, spring out upwards and lift the edge of the picture, or separate metal leaf springs may be provided.

The bars 134 are mirror-symmetrical in shape and therefore have lands 68 at both ends with edges 72. The reason for this is that when the bars are to be coated automatically with the retentive coating no sorting is necessary. In addition, apertures 138 must of course be provided, through which project guide or wedge-like projections 140 for the separator bar which are moulded onto the bottom shell of the housing on the end at which it is gripped by the user. The bars are fixed in the bottom shell by pressing lugs into corresponding channels in the bottom shell of the housing, and they are accurately positioned by means of one of two pins, namely by means of the pin remote from the grip part of the slider member, while the other pin has associated with it a slot in the housing.

The bars 134 at the same time form the guide for the control key 87 arranged in the plane of symmetry, the shape, arrangement and operation of which is illustrated schematically in FIGS. 14 to 16. FIG. 14 shows the operating position, that is to say, in this position of the control key 87 the normal changeover operation occurs. The control key 87 carries a project-on 146 which points towards the separator bar 20 and has an incision 148, to complement which there is a double-faced projection 150 on the underside of the separator bar 20. If the control key 87 is now pressed while the slider member is held firmly, its projection 146 springs out in a downward direction until the double-faced projection 150 locks into the incision 148 (FIG. 15, left). The locking lug 152 projecting downwards from the projection 146 now blocks the separating means for the edge of the bottom picture in the pile, so that when the slider member is pulled the hook-like members 22 slide away from the edge of this picture also when the separator bar together with the control key 87 acts on the edge of the pile nearest to it and takes the pile along with it (FIG. 15, centre). A rib 153 here prevents the disengagement of the projection 146 which runs along on the rib 153. Near the outer end position of the slider member 14, the locking lug 152 meets a recess 154 in the rib 153, while the control key guide lugs 158 run onto a stop member 156. The projection can accordingly spring out downwards when the slider member is pulled further, and thus release itself from the separator (FIG. 15, right). When the slider member 14 is pushed in again, the control key is freely movable, so that the double-faced projection easily pushes the key in front of itself, until the key has reached its end position again (FIG. 16).

Figure 17:
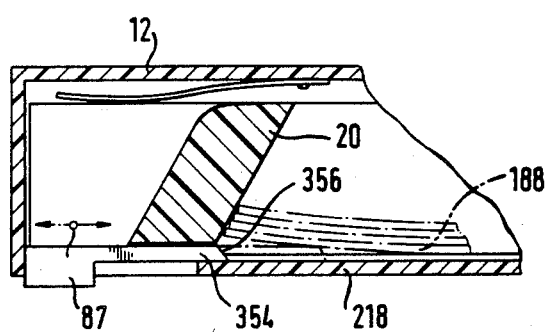
FIGS. 17 to 20 show further examples of execution of means for the complete removal of the pile of pictures.

FIG. 17 shows in a partial longitudinal sectional view an embodiment in which the separating means can be blocked at will by manual intervention. A land 354 is displaceably mounted under the separator bar 20 in the housing 12 in the direction of movement of the slider member, and displacement may be effected manually by means of a control key 87 projecting through the base 218 of the housing. In the position shown by solid lines, the separating means is operative (normal operation). If, however, the control key 87 is displaced with the land 354 towards the right, the wedge-shaped end 356 engages beneath the edge of the bottom sheet 188 in the pile facing towards it and lifts this edge onto the land 354, so that the throughgap beneath the separator bar 20 is "closed". For automatic return, the land 354 may be provided with a resilient upwardly projecting part (not shown)

Figure 18:
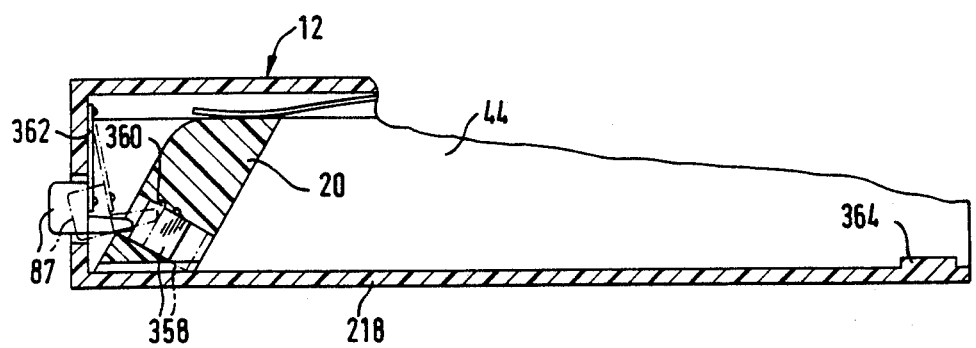

The pile removal function is also manually controllable in the embodiment according to FIG. 18 (partial longitudinal section). The separator bar 20 has a through-gap in which a blocking member 358 is movably arranged. In the position indicated by solid lines, the picture changer is switched to the changeover function, and the blocking member 358 engages by means of projections 360 in a corresponding recess in the through-gap. If by means of pressure on a control key 87, which is mounted resiliently on a moulded-on spring 362 and is connected to the housing 12, it is moved into the blocking position shown by means of broken lines, in which it can also be locked by means of projections 360, the through-gap is blocked and all sheets in the pile are transported out. When the blocking member 358 then runs onto a stop member 364 moulded onto the base 218 of the housing, it is pushed back again into its rest position, and the changer is switched to the "changeover" function again.

Figure 19:
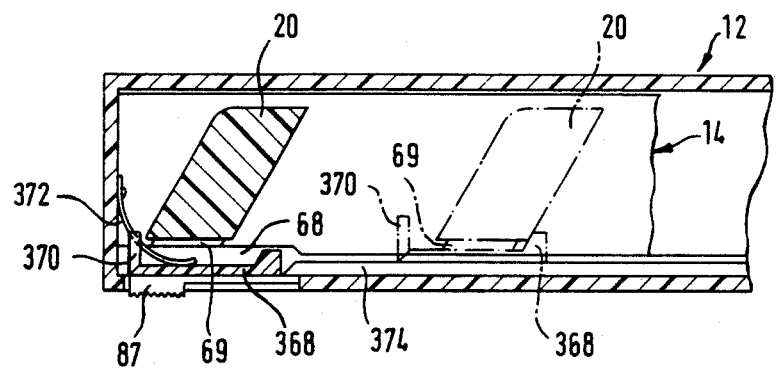
Figure 20:
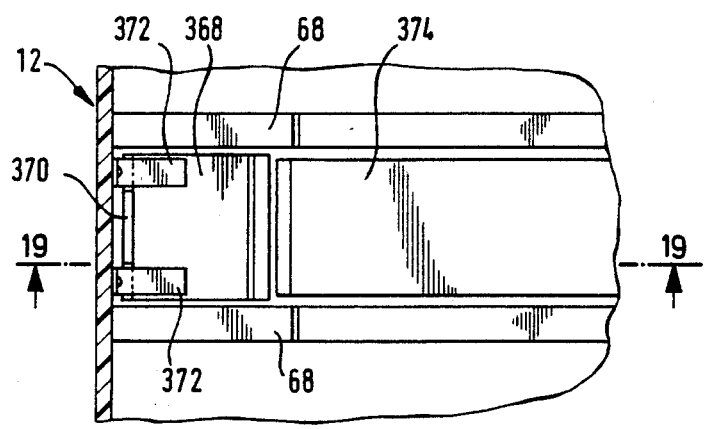

FIGS. 19 and 20 show in a partial longitudinal sectional view and in a partial plan view a further embodiment of a separating means that can be switched over for the removal of the pile. The land 68 is very narrow and of double construction. The part 69 which defines the through-gap and is arranged resiliently in the separator bar 20, has a recess opposite the gap between the two lands 68. Moulded onto the base 218 of the housing there is a control key 87 which can be pushed in and springs back, and which lifts up a blocking shoe 368 which with its forwardly-extending part blocks the through-gap whilst it lies in front of the underside of the separator bar and engages behind the separator bar with a rearwardly-extending part 370. On both sides of the latter extension, small leaf springs 372 press the blocking shoe in the direction of the base of the housing. If the control key 87 is pressed and the blocking shoe is brought into a drive connection with the separator bar, with the separating function being blocked, and the slider member 14 is now pulled, the blocking shoe is simply taken along also. During re-insertion, the small springs 372 then push the shoe into the release position again, where a trough-like recess is provided behind the run-up ramp 374.

I claim:

1. Apparatus for cyclic rearrangement of a pile of substantially planar rectangular sheets of nominally identical thickness, said apparatus comprising a first frame part and a second frame part, said frame parts being reciprocable parallel to a main plane of said pile relative to one another in a reciprocation direction between a closed position and an open position, the apparatus further comprising means for removal, upon each reciprocation of said parts, of an individual sheet at one end of said pile and for adding it to the other end of said pile, said means including:

separating means for separating said individual sheet from said pile and comprising:
   (a) a separator bar in said second frame part, said bar extending transverse to said reciprocation direction and having surface portions for engaging those borders of the sheets in the pile which are trailing upon the start of said reciprocation from said closed position,
   (b) one of said frame parts having a support for positioning said individual sheet in said one frame part, and said bar having an edge extending parallel to said borders and transverse to said reciprocation direction and being adjacent to said support,
   (c) spacing means cooperating with said separator bar for defining a passage gap between said support and said edge for allowing entry of said individual sheet positioned in said one frame part into said gap in order to separate said individual sheet from said pile, said gap having height greater than the thickness of one sheet and less than the thickness of two sheets, said gap being normally open over a predetermined portion of said reciprocation, and the apparatus including selectively actuatable means for preventing, upon actuation, entry of said individual sheet into said gap so as to deactivate separation of said individual sheet from said pile and to hold the entire pile in said second frame part.

2. The apparatus of claim 1 wherein a rotation-preventing means is provided for said individual sheet during said reciprocation to secure said individual sheet against rotation about an axis perpendicular to said plane of said individual sheet.

3. The apparatus of claim 1 further including a retaining device provided on the first frame part which comprises first and second retaining means, the first of which holds said individual sheet at the beginning of the movement of the frame parts from said closed position to said open position, the second of which holds said individual sheet at the end of the movement from said closed position to said open position, and both of which hold said individual sheet between said beginning and end of movement.

4. Apparatus for cyclic rearrangement of a pile of substantially planar rectangular sheets of nominally identical thickness, said apparatus comprising a first frame part and a second frame part, said frame parts being reciprocable parallel to a main plane of said pile relative to one another in a reciprocation direction between a closed position and an open position, the apparatus further comprising means for removal, upon each reciprocation of said parts, of an individual sheet at one end of said pile and for adding it to the other end of said pile, said means including:

separating means for separating said individual sheet from said pile and comprising:
(a) a separator bar in said second frame part, said bar extending transverse to said reciprocation direction and having surface portions for engaging those borders of the sheets in the pile which are trailing upon the start of said reciprocation from said closed position,
(b) one of said frame parts having a support for positioning said individual sheet in said one frame part, and said bar having an edge extending parallel to said borders and transverse to said reciprocation direction and being adjacent to said support,
(c) spacing means cooperating with said separator bar for defining a passage gap between said support and said edge for allowing entry of said individual sheet positioned in said one frame part into said gap in order to separate said individual sheet from said pile, said gap having a height greater than the thickness of one sheet and less than the thickness of two sheets, said gap being normally open over a predetermined portion of said reciprocation, and the apparatus including selectively actuatable means for closing, upon actuation, said gap so as deactivate separation of said individual sheet from said pile and to hold the entire pile in said second frame part.

5. The apparatus of claim 4 including a blocking member manually displaceable into said gap.

6. The apparatus of claim 5 wherein said blocking member is integrally formed with an actuating member.

7. The apparatus of claim 6 wherein said actuating member is a control key displaceable relative to said frame parts.

8. The apparatus of claim 7 wherein said control key is displaceable into a blocking position when said frame parts are in said closed position and is re-displaced into an initial position upon implementation of a reciprocation of said frame parts.

9. The apparatus of claim 8 wherein said key is re-displaced upon engagement of stop means during said reciprocation.

10. The apparatus of claim 7 wherein said first frame part is a housing having an opening through which said second frame part is reciprocally slideable, said control key being disposed at a housing portion opposite said opening.

11. The apparatus of claim 10 wherein said control key is disposed in a housing recess.

12. The apparatus of claim 10 wherein said control key is disposed in a housing wall extending substantially parallel to a plane defined by said housing opening.

13. The apparatus of claim 7 wherein said control key is displaceable substantially in the direction of said reciprocation.

14. The apparatus of claim 4 wherein said selectively actuatable means include a blocking member mounted in said second frame part and an actuating key mounted in said first frame part so as to engage said blocking member when said frame parts are in said closed position.

15. Apparatus for cyclic rearrangement of a pile of substantially planar rectangular sheets of nominally identical thickness, said apparatus comprising a first frame part and a second frame part, said frame parts being reciprocable parallel to a main plane of said pile relative to one another in a reciprocation direction between a closed position and an open position, the apparatus further comprising means for removal, upon each reciprocation of said parts, of an individual sheet at one end of said pile and for adding it to the other end of said pile, said means including:

separating means for separating said individual sheet from said pile and comprising:
(a) a separator bar in said second frame part, said bar extending transverse to said reciprocation direction and having surface portions for engaging those borders of the sheets in the pile which are trailing upon the start of said reciprocation from said closed position,
(b) one of said frame parts having a support for positioning said individual sheet in said one frame part, and said bar having an edge extending parallel to said borders and transverse to said reciprocation direction and being adjacent said support,
(c) spacing means cooperating with said separator bar for defining a passage gap between said support and said edge for allowing entry of said individual sheet positioned in said one frame part into said gap in order to separate said individual sheet from said pile, said gap having a height greater than thickness of one sheet and less than the thickness of two sheets, said gap being normally open over a predetermined portion of said reciprocation, and the apparatus including selectively actuatable means for displacing, upon actuation, said spacing means in the direction of said reciprocation so as to deactivate separation of said individual sheet form said pile and to hold the entire pile in said second frame part.

16. The apparatus of claim 15 wherein said spacing means includes a spacer member slidably displaceable along said support.

17. The apparatus of claim 16 wherein said spacer member is adapted to engage beneath said pile of sheets so as to displace it away from said support.

18. The apparatus of claim 16 wherein said spacer member is integrally formed with an actuating key.

19. The apparatus of claim 15 wherein said spacing means are re-displaceable into an initial position upon a reciprocation of said frame parts.

20. The apparatus of claim 15 wherein said first frame part is a housing having an opening at one end, and said second frame part is a slider reciprocable through said opening, and said spacing means having an actuating key extending through an aperture in a housing wall which extends parallel to said reciprocation direction.

* * * * *